Patented Oct. 22, 1929

1,732,894

UNITED STATES PATENT OFFICE

ROBERT M. ISHAM, OF OKMULGEE, OKLAHOMA, ASSIGNOR TO DOHERTY RESEARCH COMPANY, OF NEW YORK, N. Y., A CORPORATION OF DELAWARE

SEPARATION OF ALCOHOLS FROM POLYMERS

No Drawing.   Application filed March 26, 1926. Serial No. 97,765.

The present invention relates to the separation of polymerized olefins from alcohols. It is well known that in the process of forming alcohols by absorbing olefins in mineral acid and afterward hydrolyzing the esters formed, the alcohols obtained are originally contaminated by a certain amount of polymers. The alcohols formed by the process just mentioned are principally secondary alcohols.

Very considerable difficulty has been experienced in obtaining a satisfactory commercial separation between polymers and the alcohols obtained from olefin materials. The presence of the polymers greatly reduces the market value of the alcohols and severely limits their application. For some purposes, moreover, a very small amount of polymers renders the alcohols unsuitable.

According to the present invention, the separation between alcohol or alcohols and polymers dissolved therein is attained by treating the impure solution of alcohol or alcohols with benzene sulfonic acid and afterward separating the polymers from the alcohol and acid. According to the present invention benzene sulfonic acid is added to alcohol containing polymers and thoroughly mixed therewith, the acid being added in an amount sufficient to dissolve all the alcohol. I have found that the polymers are not soluble in the benzene sulfonic acid whereas the alcohol is soluble. By dissolving the alcohol in the acid, the polymers are thereby thrown out of solution being thrown into the surface layer or forming a surface layer if one is not present originally. The polymers can then be separated from the solution of alcohol and benzene sulfonic acid by decantation.

A specific example of the application of the present invention in practice is as follows: It is common practice in plants manufacturing alcohols from gaseous or liquid olefins, to obtain alcohols first in the form of a crude mixture comprising dilute water-soluble alcohols forming a lower layer, and water-insoluble alcohols forming a surface layer, both layers being more or less contaminated by polymers, although the surface layer will hold ordinarily the majority of polymers. Assuming that a given plant for the production of alcohols from alkyl esters formed from olefins has a daily production of three hundred gallons of alcohol and assuming that the crude alcohol in the bottom layer of the mixture of alcohols containing polymers would be of 50% concentration, the crude alcohol mixture is treated according to the present invention by addition of three hundred gallons of 60% benzene sulfonic acid, the sulfonic acid and crude alcohols being intimately mixed at the time of the addition of the acid and thereupon allowed to settle. By this treatment, the alcohols are dissolved in the benzene sulfonic acid, the polymers originally held in the lower layer of the alcohols rising to the surface and uniting with the polymers originally in the surface layer to form a new surface layer. The new surface layer, however, is not so thick as the original surface layer owing to the removal therefrom of the heavy alcohols which originally formed the larger part of the surface layer. These heavy alcohols having been dissolved in the benzene sulfonic acid are carried by it into the lower layer. The polymers which compose the surface layer formed after the agitation of the crude alcohols with the benzene sulfonic acid are decanted off and the alcohols can then be separated from the benzene sulfonic acid by distillation. The final concentration of the benzene sulfonic acid is about 30%.

It will be noted above that the original concentration of the benzene sulfonic acid added to the crude alcohols is 60%. It has been found preferable not to use concentrated acid when operating according to the present invention. Unless the benzene sulfonic acid is somewhat dilute it dissolves some of the polymers and these may distill over with the alcohols, unless separated by special treatment prior to distillation, when the mixture of alcohol and benzene sulfonic acid is distilled to separate the two components. This preliminary separation of small amounts of polymers from a mixture of alcohols and benzene sulfonic acid prior to distillation can, however, be performed by agitating the mixture with mineral seal oil. The mineral seal oil dissolves the polymers when agitated with the mixture and the oil-polymer mixture rises to the surface when the mixture has become quiet. The mineral seal oil and polymers are then decanted off and the alcohol distilled off from the benzene sulfonic acid.

The water-soluble alcohols, such as ethyl, isopropyl and butyl, are readily separated from polymers by solution in benzene sulfonic acid as just described, especially if the acid is somewhat dilute. Certain alcohols, however, are substantially insoluble in water. Secondary hexyl and heptyl alcohols are examples of such water-insoluble alcohols. If it is desired to treat such water-insoluble alcohols for the separation of polymers according to the present invention, the presence of some water-soluble alcohol has been found essential. For instance, in the example given above, the lower layer of crude alcohols, forming the great bulk of liquid treated, consists of highly water-soluble alcohols; namely isopropyl, secondary butyl and tertiary butyl alcohols.

Having thus described my invention, I claim:

1. The method of separating an alcohol from polymers dissolved therein, said polymers being of the type difficultly soluble in benzene sulphonic acid comprising treating the alcohol-polymer solution with benzene sulfonic acid to dissolve the alcohol, and thereupon separating the polymers from the acid alcohol solution and the alcohol from the acid.

2. The method of separating an alcohol which is readily soluble in water from polymers dissolved therein, said polymers being of the type difficultly soluble in benzene sulphonic acid comprising treating the alcohol-polymer solution with benzene sulfonic acid to dissolve the alcohol and thereby separating out polymers in the form of a surface layer, decanting said polymers from the acid-alcohol solution, and distilling the acid and alcohol to separate out the alcohol.

3. The method of separating polymers from a crude mixture of polymers and alcohols produced by hydrolyzing a mixture of alkyl esters and polymers formed from the action of a mineral acid on olefin containing materials, which comprises mixing with the said mixture of polymers and alcohols a dilute solution of benzene sulphonic acid, allowing the resulting mixture to settle whereby the polymers are collected in one layer and the alcohols in another, and separating the two layers by decantation.

4. The method defined in claim 3 in which said benzene sulphonic acid solution has a concentration of not more than 60% benzene sulphonic acid.

In testimony whereof I affix my signature.

ROBERT M. ISHAM.